UNITED STATES PATENT OFFICE.

WILLIAM GRAY PHILLIPS, JR., AND WILLIAM FRANCIS McKENNA, OF BROOKLYN, NEW YORK.

COFFEE PRODUCT AND PROCESS OF MAKING THE SAME.

1,271,761. Specification of Letters Patent. Patented July 9, 1918.

No Drawing. Application filed May 20, 1915. Serial No. 29,362.

*To all whom it may concern:*

Be it known that we, WILLIAM GRAY PHILLIPS, Jr., and WILLIAM FRANCIS McKENNA, citizens of the United States, residing at Brooklyn, in the county of Kings and State of New York, have invented certain new and useful Improvements in Coffee Products and Processes of Making the Same; and we do declare the following to be a full, clear, and exact description of the invention, such as will enable others skilled in the art to which it appertains to make and use the same.

This invention relates to a coffee product and process of making the same.

One object of the invention is to provide a coffee product which is superior in flavor; which is formed in units of a size and shape easily and conveniently transported and handled, and being compact in form avoids waste. These units are not effected by moisture and will retain their flavor after exposure for days at atmospheric conditions.

Another object of the invention is to provide a process for producing this product whereby it may be conveniently produced ready for use.

Another object of the invention is to produce a product or compound of this character which on the addition of water dissolves and results in a beverage which is exactly like coffee in aroma and taste and has all the attributes of high grade coffee.

With these and other objects in view the invention consists of certain novel features of construction and the combination and arrangement of parts as will be hereinafter more fully described and claimed.

The process employed for producing the product above described and which comprises a portion of this invention consists in the following steps employed for combining the following ingredients, to wit: To prepare sixteen coffee cubes or units sufficient for making sixteen cups of coffee the following ingredients are employed:

Eight ounces of roasted finely ground coffee beans are placed in a fine sieve and one gallon of boiling water is poured over this coffee and allowed to percolate through the sieve in a vessel kept hot to receive it, and this operation is repeated until an infusion of the desired strength is obtained. The resulting filtrate or infusion is then distributed thinly over suitable plates composed of porcelain or glass and heated to a temperature not exceeding 212 degrees Fahrenheit and thus evaporated to dryness. The plates are retained at the required temperature by any suitable means and when the filtrate is thoroughly evaporated it appears as a dark brown slightly shiny coating on the plates. It is important that the filtrate be not heated over 212 degrees Fahrenheit because it has been found by experiment that higher temperatures destroy certain aromatic principles which detract from the flavor of the product. This coating is removed from the plates by scraping with suitable implements and when removed is in the form of a finely granulated powder. This powder is too friable to be compressed into suitable shapes and is somewhat lacking in flavor, and to produce the desired flavor and the necessary consistency to enable it to be molded properly to produce the finished product, coffee oil is added to the powder and this oil while it may be produced in a variety of ways is preferably formed by taking four ounces of finely pulverized coffee and adding to this four ounces of ether, placing them together in a well closed receptacle and allowing them to remain for forty-eight hours. At the end of this time the mixture should be filtered and the filtrate is in the form of an amber yellow oil fluid. This fluid is then placed in a glass container which is heated sufficiently to drive off the ether, leaving a dark yellow fluid smelling strongly of coffee and containing all of the aromatic and volatile constituents of coffee, commonly termed "coffee oil." Fifty drops of coffee oil are added to the brownish powder above described and the mixture is thoroughly triturated in a mortar. After being so treated it is still in the form of a powder but may now easily be molded into any desired shape. The quantity above described is divided into sixteen equal parts and each unit is molded into the desired shape by pressure, the units being pressed sufficiently to hold the ingredients together in the desired shape and yet permit them to dissolve readily on the application of water thereto.

When it is desired to make a cup of coffee all that is necessary is to place one of these units in a cup of boiling water when it will readily dissolve and result in a perfectly clear coffee colored beverage which constitutes a very palatable drink delicious in flavor and exhiliratinug in effect.

It is of course to be understood that these units may be in the form of cubes, tablets or any other desired form.

We claim as our invention:

The method of producing coffee tablets consisting in making a strong infusion by boiling a quantity of ground coffee beans in water, then heating said infusion on a flat bottomed container until all liquid has evaporated therefrom, but no longer, in order to prevent scorching of the powdered residue, removing such residue from the container and mixing it with pure coffee oil to form a damp powder and to restore any characteristics destroyed by the foregoing steps, and then molding such powder into desired shapes.

In testimony whereof we have hereunto set our hands in presence of two subscribing witnesses.

WILLIAM GRAY PHILLIPS, Junior.
WILLIAM FRANCIS McKENNA.

Witnesses:
JOHN THOMSON,
ALEC NICOL THOMSON.